United States Patent [19]
Adelson et al.

[11] Patent Number: 4,817,182
[45] Date of Patent: Mar. 28, 1989

[54] TRUNCATED SUBBAND CODING OF IMAGES

[75] Inventors: Edward H. Adelson, Cambridge; Eero P. M. Simoncelli, Sommerville, both of Mass.

[73] Assignee: General Electric Company, Schenectady, N.Y.

[21] Appl. No.: 45,987

[22] Filed: May 4, 1987

[51] Int. Cl.$^4$ .............................................. G06K 9/36
[52] U.S. Cl. ...................................... 382/56; 382/41; 364/724.05; 364/724.1
[58] Field of Search .............................. 382/31, 41–43, 382/49, 54, 56; 381/29, 31; 358/31, 38; 364/723–725, 728

[56] References Cited

U.S. PATENT DOCUMENTS

| | | | |
|---|---|---|---|
| 4,455,649 | 6/1984 | Esteban et al. | 381/31 |
| 4,569,075 | 2/1986 | Nussbaumer | 381/29 |
| 4,674,125 | 6/1987 | Carlson et al. | 382/41 |
| 4,691,292 | 9/1987 | Rothweiler | 364/724 |
| 4,709,394 | 11/1987 | Bessler et al. | 382/41 |
| 4,718,104 | 1/1988 | Anderson | 382/43 |

OTHER PUBLICATIONS

"An Efficient Pyramid Image Coding System", A. Tran et al., CH 2396-0/87/0000-0744 $01.00 copyrighted 1987 IEEE.
"Low-Rate Speech Encoding Using Vector Quantization and Subband Coding", H. Abut & S. Ergezinger, CH 2243-4/86/0000-0449 $1.00 copyrighted 1986 IEEE.
"Subband Coding of Images", J. W. Woods & S. D. O'Neil, 0096-3518/86/1000-1278 $01.00 copyrighted 1986 IEEE.
"An Efficient Image Representation For Multiscale Analysis", Stephane Mallat, Topical Meeting On Machine Vision, Incline Village, Nevada 3/18–20/1987 pp. 172–175.

Primary Examiner—Leo H. Boudreau
Assistant Examiner—Jose L. Couso
Attorney, Agent, or Firm—William Squire; James C. Davis, Jr.; Paul R. Webb, II

[57] ABSTRACT

Image data is analyzed in a number of iterated analysis procedures, using two-dimensional quadrature mirror filters to separate low-pass spatial filter response component and three differently oriented high-pass spatial filter response components, which filter response components are decimated in both dimensions. The high-pass filter response components are coded as is. The low-pass filter response component is coded as is only in the last iteration; in the earlier analysis procedures the low-pass filter response component provides the input data for the secceeding analysis procedure.

9 Claims, 4 Drawing Sheets

TRUNCATED SUBBAND CODING OF IMAGES

The invention relates to the processing of digitized image data during its encoding for storage or transmission, and to the processing of the resulting codes during the recovery of image data corresponding to that encoded.

BACKGROUND OF THE INVENTION

Incorporated herewithin by reference is an article "Subband Coding of Images" by J. W. Woods and S. D. O'Neil appearing in pages 1278–1288 of IEEE TRANSACTIONS ON ACOUSTICS, SPEECH AND SIGNAL PROCESSING, Vol. ASSP-34, No. 5, October 1986. Woods and O'Neil describe a filter tree branching four ways at each successive node in the tree structure. This filter tree is used for decomposing an image into components exhibiting reduced degrees of randomness in their samples, as a step in an entropic coding procedure.

Entropy is a measure of the degree of randomness of a set of random variables in the xsamples of a code stream. Entropic coding reduces code lengths by reducing the degree of randomness in a stream of samples so it can be encoded in a more efficient manner. Dissection of data by filtering is a typical procedure for reducing randomness in data. In entropic coding it is also typical to use differential pulse code modulation (DPCM) to reduce the degree of randomness in picture-element (pixel) samples. It is also typical in entropic coding to include a final step of run-length coding or of variable-length statistical coding, such as Huffman coding.

At each node in the Woods and O'Neil filtering tree, a description of image samples from the trunk or a major branch of the filter tree is decomposed by four branch processes. In these processes the description of image samples received at the node from which the branches stem is convolved with the responses of a set of four filters that are two-dimensional quadrature mirror filters (QMFs). The first, second, third and fourth filters of the QMF set respectively low-pass-filter in both first and second orthogonal dimensions of image space, low-pass-filter in that first dimension and high-pass-filter in that second dimension, high-pass-filter in that first dimension and low-pass-filter in that second dimension, and high-pass-filter in both those first and second dimensions. These filter responses are in effect each subjected to successive decimations, first in the first dimension and then in the second dimension, to generate the image samples supplied at the following four subnodes of the filter tree. Each of the resulting subbands is divided into at least quarters by an iteration of the quadrature mirror filtering and the two-dimensional decimation procedure already described.

SUMMARY OF THE INVENTION

The present inventors have developed a procedure for analyzing and then entropically encoding image data which takes into account that the decimated convolutions of image data with the responses of the second, third and fourth filters of the QMF set usually exhibit relatively low entropies and that the decimated convolution of the image data with the response of the first filter usually exhibits relatively high entropy. The Woods and O'Neil filter tree is pruned so as not to include subbranch filtering from the decimated convolutions of image data with responses of the second, third and fourth filters of the QMF set. Instead, these decimated convolution results are directly supplied to the means for entropic coding. This improved procedure the present inventors denominate "truncated subband coding of images".

The invention also comprises modifications of the Woods and O'Neil procedure for decoding entropic codes and synthesizing reconstructed image data. Simplifications are made possible by the truncated subband coding of images.

BRIEF DESCRIPTION OF THE PATENT DRAWING

DETAILED DESCRIPTION

Figure 1:
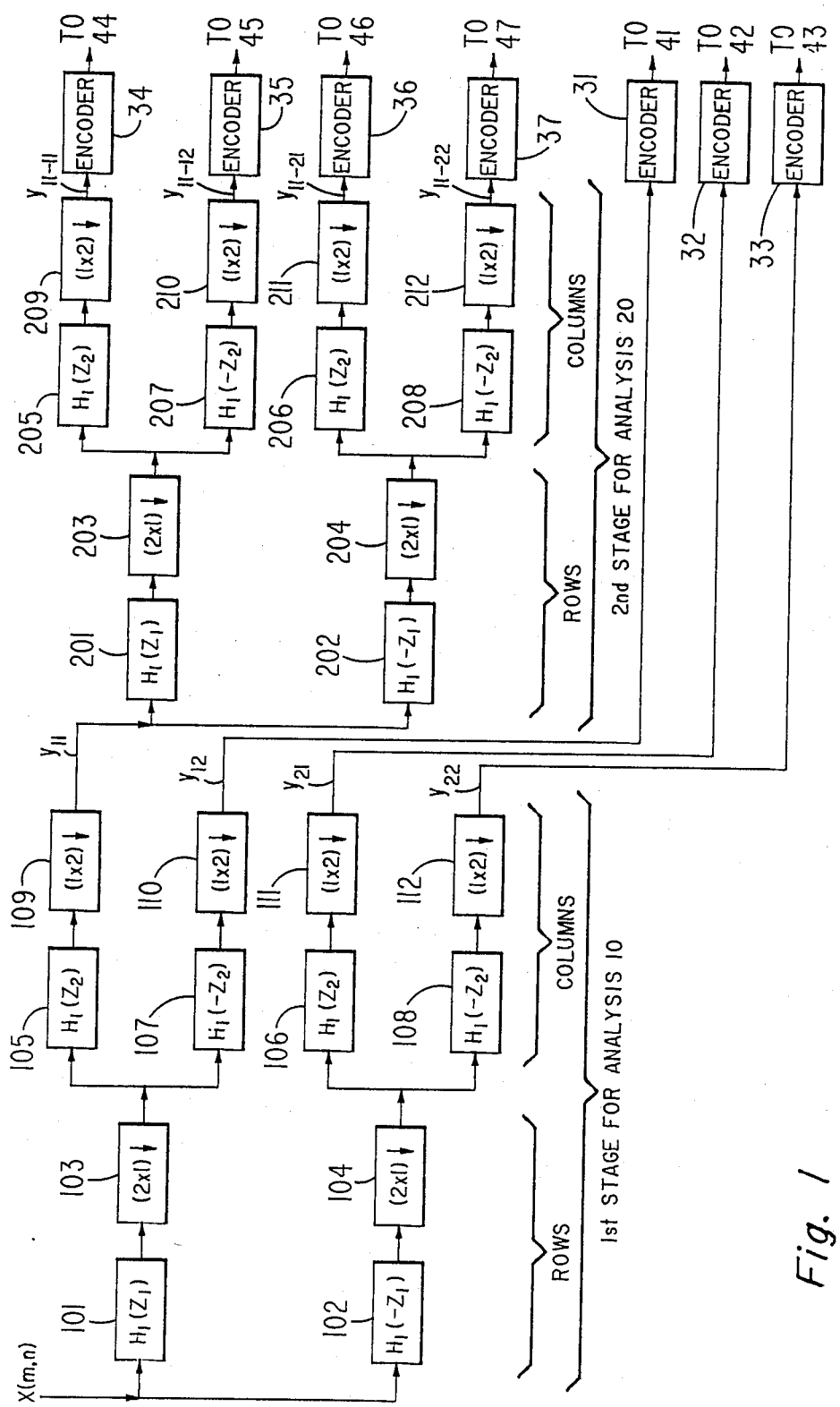
FIG. 1 is a schematic diagram of representative apparatus for analyzing image data and encoding the analyses in accordance with an aspect of the invention.

The apparatus for analyzing image data and encoding the analyses, which is shown in FIG. 1 of the patent drawing, has first and second stages 10 and 20 for performing the first and second of iterated analysis procedures, respectively. Modifications of this apparatus having a multiplicity of stages for performing more than two iterated analysis procedures are possible and indeed desirable up to three or four stages. There is seldom much advantage of five or more stages, since usually most of the entropy reduction for image data takes place in the higher spatial-frequency bands.

Figure 3:
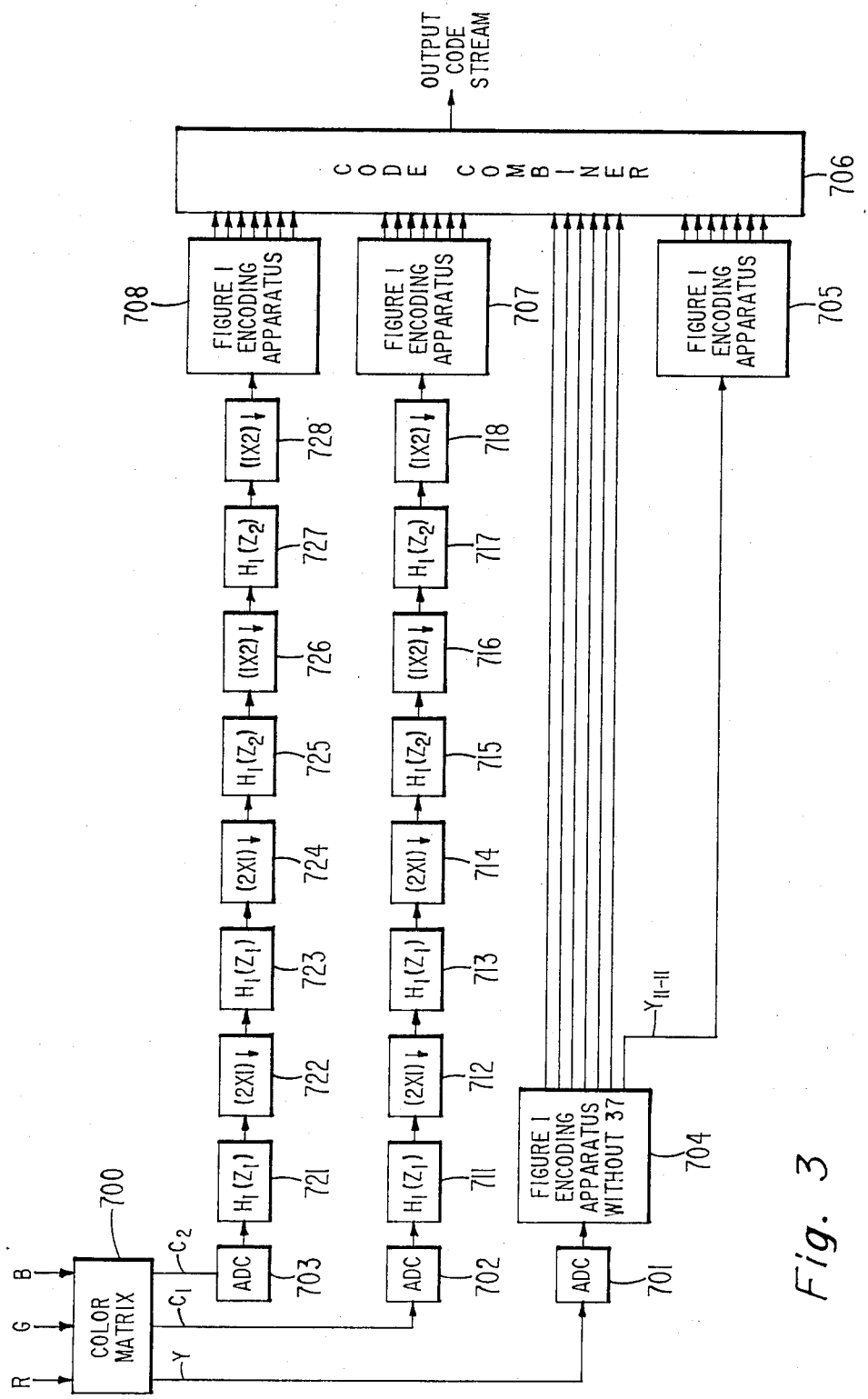
FIG. 3 is a schematic diagram of representative apparatus for analyzing polychromatic image data and encoding the analyses in accordance with a further aspect of the invention.

Recognition of the fact that usually most of the entropy reduction for image data takes place in the higher spatial-frequency bands underlies the differences between the apparatus shown in FIG. 1 of the patent drawing and the apparatus shown in FIG. 3 of the Woods and O'Neil article. The first stage 10 of the two apparatuses are essentially identical. In the Woods and O'Neil apparatus the $y_{11}$, $y_{12}$, $y_{21}$ and $y_{22}$ responses of this first stage are all subjected to further analysis before coding, this being done in a second rank of quadrature mirror filters consisting of a rank of four second stages for analysis. In the apparatus of the present invention only the low-pass spatial-frequency filter response $y_{11}$ is forwarded to a second stage 20 for further analysis. The oriented high-pass spatial-frequency filter responses $y_{12}$, $y_{21}$ and $y_{22}$ are supplied directly to encoders 31, 32 and 33 respectively without further analysis.

The apparatus shown in FIG. 1 of the patent drawing uses only a first stage 10 and a second stage 20 for analysis, so second stage 20 is also the final stage for analysis. The low-pass spatial-frequency filter response of the final stage (here, $y_{11-11}$) is supplied to an encoder 34 as well as its high-pass spatial-frequency filter responses (here, $y_{11-12}$, $y_{11-21}$ and $y_{11-22}$) being supplied to respective encoders 35, 36 and 37.

In modifications of this apparatus having further stages for analysis, the same rule of design is followed. Suppose there is a plurality, p in number, of stages for analysis which are consecutively ordinally numbered first through $p^{th}$. In each stage except the final $p^{th}$ one, each of the three oriented high-pass spatial-frequency filter responses are encoded without further spatial-frequency analysis, and the low-pass spatial-frequency filter response is used as input signal for the succeeding stage for analysis. In the final, $p^{th}$ stage, the low-pass spatial-frequency filter response and the three oriented high-pass spatial-frequency filter responses are all encoded without further spatial-frequency analysis. Encoders 31–37 preferably entropically encode, but may be other types of encoders (e.g., ones performing simple non-linear coding of amplitude values).

Where spatial filtering is done on a pipelined basis, the apparatus of the invention uses substantially less spatial filtering than the Woods and O'Neil apparatus, as shown in tabulated form below, but achieves nearly the same efficiencies in encoding. N is the number of successive ranks of stages for analysis, and R is the ratio of the complexity of spatial filtering elements needed for the apparatus of the invention to the complexity of the spatial filtering elements needed for the Woods and O'Neil apparatus.

| N | R |
|---|---|
| 1 | 1 |
| 2 | 2/5 |
| 3 | 3/21 = 1/7 |
| 4 | 4/85 |

If one considers the differences in computation times for calculating the spatial transforms of the present invention and for calculating the spatial transforms of the Woods and O'Neil procedure, the following observations can be made. In the present invention the computational time per frame of image grows only as the logarithm-base-two of the octaves of analysis. In the Woods and O'Neil procedure each successive octave of analysis involves the same amount of computation as its predecessor.

In FIG. 1 of the patent drawing, each of the elements 101 and 201 convolves the current row of samples supplied to its input with the low-pass filter kernel in the first, or row, dimension. Each of the elements 102 and 202 convolves the current row of samples supplied to its input with the complementary high-pass filter kernel in the first, or row, dimension. Each of the elements 103, 104, 203 and 204 is a decimator down-sampling 2:1 in the first, or row, dimension. In respective transversal spatial filtering operations each of the elements 105, 106, 205 and 206 convolves the low-pass filter kernel in the second, or column, dimension with the current sample and samples from a number of previous rows of samples supplied to its input. In respective transversal spatial filtering operations each of the elements 107, 108, 207 and 208 convolves the high-pass filter kernel in the second, or column, dimension with the current sample and samples from a number of previous rows of samples supplied to its input. Each of the elements 109–112 and 209–212 is a decimator down-sampling 2:1 in the second, or column, dimension.

In the case where the kernel $H_1$ is even, the decimations performed by decimators 101 and 102 are in phase with each other. So are the decimations performed by decimators 109 and 110, by decimators 106 and 108, by decimators 201 and 202, by decimators 209 and 210, and by decimators 211 and 212. In the case where the kernel $H_1$ is odd, the decimations performed by the two decimators in each of these pairs of decimators are out-of-phase one with the other.

To generate other embodimwents of the invention, the apparatus of FIG. 1 of the patent drawing is modified to replace one or more of the stages of analysis by one or more respective stages of analysis in which convolution and decimation are carried out on column samples prior to row samples, using the alternative technique of separable two-dimensional spatial filtering. Separable two-dimensional spatial filtering is done with different kernels in the row convolutions than in the column convolutions in still further embodiments of the invention. In yet further embodiments of the invention non-separable two-dimensional spatial filters that operate as quadrature mirror filters are used. Separable filtering first by row and then by column is preferred when image data is supplied in raster scan form to a pipeline processor, because of the reduction in the number of samples that must be temporarily stored in the convolution procedures.

Figure 2:
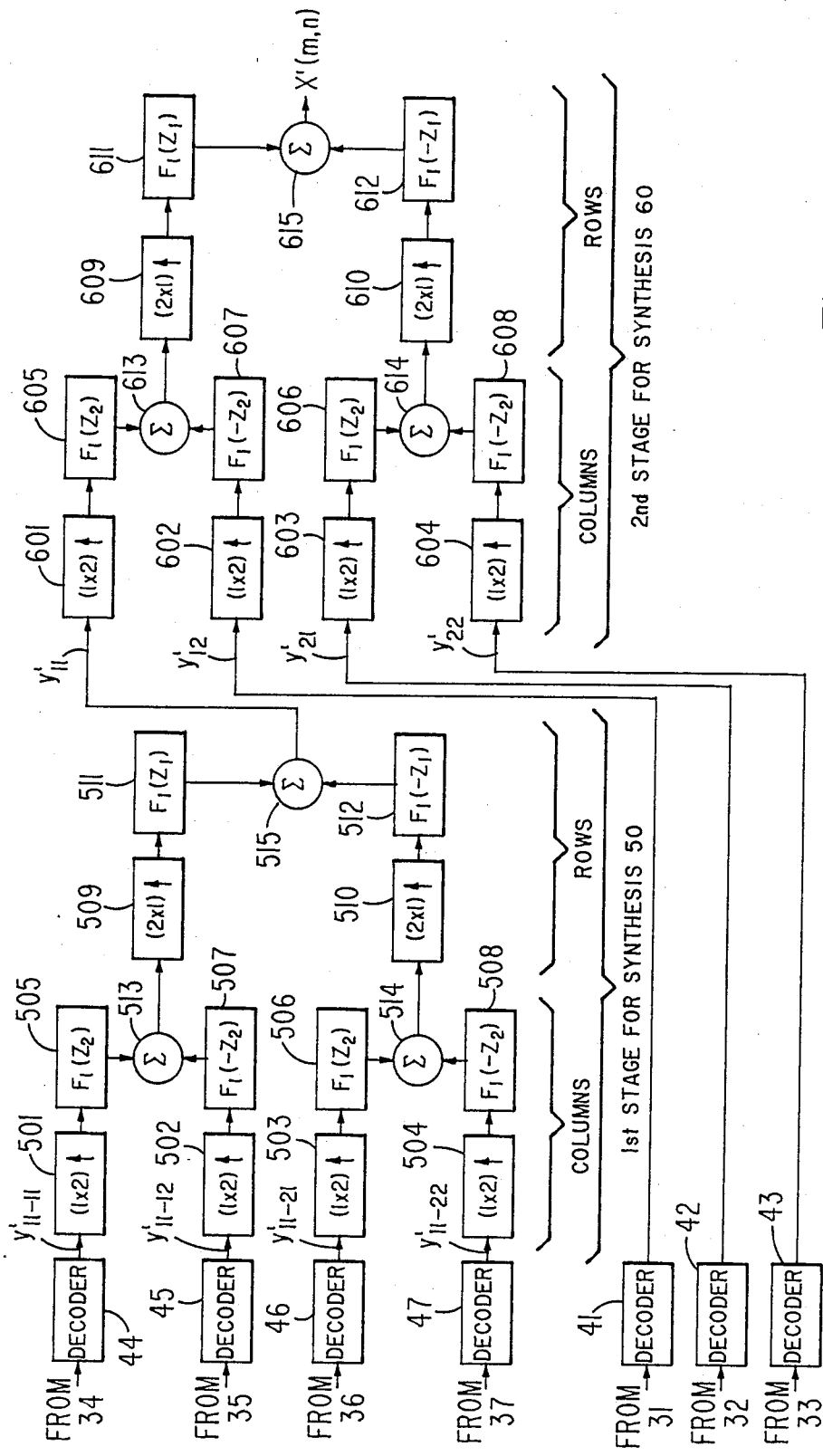
FIG. 2 is a schematic diagram of representative apparatus for decoding codes as generated by apparatus of the sort shown in FIG. 1 and synthesizing reconstructed image signal from those codes in accordance with another aspect of the invention.

FIG. 2 of the patent drawing shows apparatus for reconstructing a replica x'(m,n) of the original image data x(m,n), proceeding from the codes generated responsive to x(m,n) by encoders 31–37 of the apparatus shown in FIG. 1 of the patent drawing. The image reconstruction apparatus includes decoders 41–47 for decoding the codes originating from encoders 31–37 respectively. (The interface between the encoders 31–37 and the decoders 41–47 generally includes code synchronization apparatus. This code synchronization may provide for time-division-multiplexing of the code streams during transmission over a single channel, rather than the code streams being transmitted in parallel. In any case allowance is made in the code synchronization apparatus for the further processing of $y_{11}$ as compared to $y_{12}$, $y_{21}$ and $y_{22}$ taking additional time in the two-dimensional spatial-filtering procedures both in the apparatus in FIG. 1 of the patent drawing and in the apparatus in FIG. 2 of the patent drawing.)

The $y'_{12}$, $y'_{21}$ and $y'_{22}$ signals respectively recovered by decoders 41, 42 and 43 respectively resemble the $y_{12}$, $y_{21}$, $y_{22}$ signals respectively supplied encoders 31, 32 and 33, except for errors introduced in the encoding and decoding procedures. A $y'_{11}$ signal resembling the $y_{11}$ signal supplied to the second stage 20 for analysis has to be synthesized from the $y'_{11-11}$, $y'_{11-12}$, $y'_{11-21}$ and $y'_{11-22}$ signals recovered by decoders 44, 45, 46 and 47 respectively. This synthesis of $y'_{11}$ signal is performed in the first stage 50 for synthesis. The $y'_{11-11}$, $y'_{11-12}$, $y'_{11-21}$ and $y'_{11-22}$ signals from decoders 44–47 resemble the signals $y_{11-11}$, $y_{11-12}$, $y_{11-21}$ and $y_{11-22}$ supplied to encoders 34–37 except for errors introduced in the coding and decoding procedures. Each is up-sampled. This is done by padding each with interstitial rows and columns of null samples, then passing each of the expanded functions through quadrature mirror filters of the same general type used in its generation. The quadrature mirror filters used in synthesis may be identical to those used in analysis. Alternatively, one may use simpler quadrature mirror filters in synthesis, compensating for their shortcomings in response by using better filters in analysis.

More particularly, in the first stage 50 for synthesis, elements 501–504 are circuits for interleaving rows of decoder output samples with rows of null samples. Elements 505 and 506 convolve the samples supplied their inputs with the low-pass spatial-filtering kernel in the second or column dimension. Elements 507 and 508 convolve the samples supplied their inputs with the high-pass spatial-filtering kernel in the second, or column, dimension. The low-pass and high-pass filter responses from the convolvers 505 and 507 are linearly combined by an adder/subtractor 513 for application to an up-sampler 509. The low-pass and high-pass filter responses from the convolvers 506 and 508 are linearly combined by an adder/subtractor 514 for application to an up-sampler 510. The linear combining done by adder/subtractors 513 and 514 is subtractive in nature if $F_1$ kernel is even and is additive in nature if $F_1$ kernel is odd. Up-samplers 509 and 510 interleave samples with null samples. Element 511 convolves the samples applied to its input with the low-pass spatial-filtering kernel in the first, or row, dimension. Element 512 convolves the samples applied to its input with the high-pass spatial-filtering kernel in the first, or row, dimension. The output signals from the convolvers 511 and 512 are linearly combined in an adder/subtractor 515 to generate $y'_{11}$ as an output signal. Where the $F_1$ kernel is even, the linear combining is a subtraction process. Where the $F_1$ kernel is odd, the linear combining is an addition process.

The final stage 60 for synthesis, here the second stage, is the same as the first stage 50 for synthesis. Elements 601–615 correspond in their operation to elements 501–515 except for increase in rate of operation reflective of the increase in sampling density of its input data. In modifications of the apparatus shown in FIG. 2 of the patent drawing additional stages for synthesis will resemble stages 50 and 60 except for differences in operating rates.

The first stage 50 for synthesis in FIG. 2 of the patent drawing is a quarter the amount of spatial filtering that appears in the first rank of synthesis stages in the Woods and O'Neil tree decoder apparatus for decoding a sixteen-subband coding of image data. Economies of spatial filtering, similar to that noted with regard to the coding apparatus of the invention as compared to the Woods and O'Neil tree coding apparatus, exist with regard to the decoding apparatus of the invention as compared to the Woods and O'Neil tree decoding apparatus.

Other embodiments of the invention may be generated using different low-pass and high-pass spatial-filtering kernels in the row and column dimensions. While different kernel functions are shown for coding and decoding in the patent drawing, it is possible to use similar quadrature mirror filters for coding and decoding. This is particularly convenient when coding for two-way transmissions is done.

Still other decoding apparatuses embodying the invention are generated by replacing one or more of the stages for synthesis in embodiments of the decoding invention thusfar described each with a respective stage for syntheses performing separate two-dimensional spatial filtering first in the row dimension and then in the column dimension. Still other embodiments of the decoding invention using non-separable quadrature mirror filters are possible. Conventional quadrature mirror filters use in-phase decimation, so only $H_1(z)$, $H_1(-z)$, $F_1(z)$ and $F_1(-z)$ kernels having an even number of taps are useful. The invention also can employ quadrature mirror filters which use staggered phase decimation, so kernels having an odd number of taps are useful.

Any of these embodiments may be modified by performing spatial filtering on a more distributed basis, to generate still other embodiments of the invention. For example, in FIG. 1 the decimated results of convolution with $H_1(z)$ could be separately generated to supply convolvers 105 and 107, using duplicate convolvers and decimation similar to elements 101 and 103, etc. Or, in FIG. 2 the convolution results for convolvers 505 and 507, rather than being combined for padding and subsequent convolution with $F_1(z)$, could instead be separately padded and subsequently convolved with $F_1(z)$ with the two convolution results then being summed.

Figure 4:
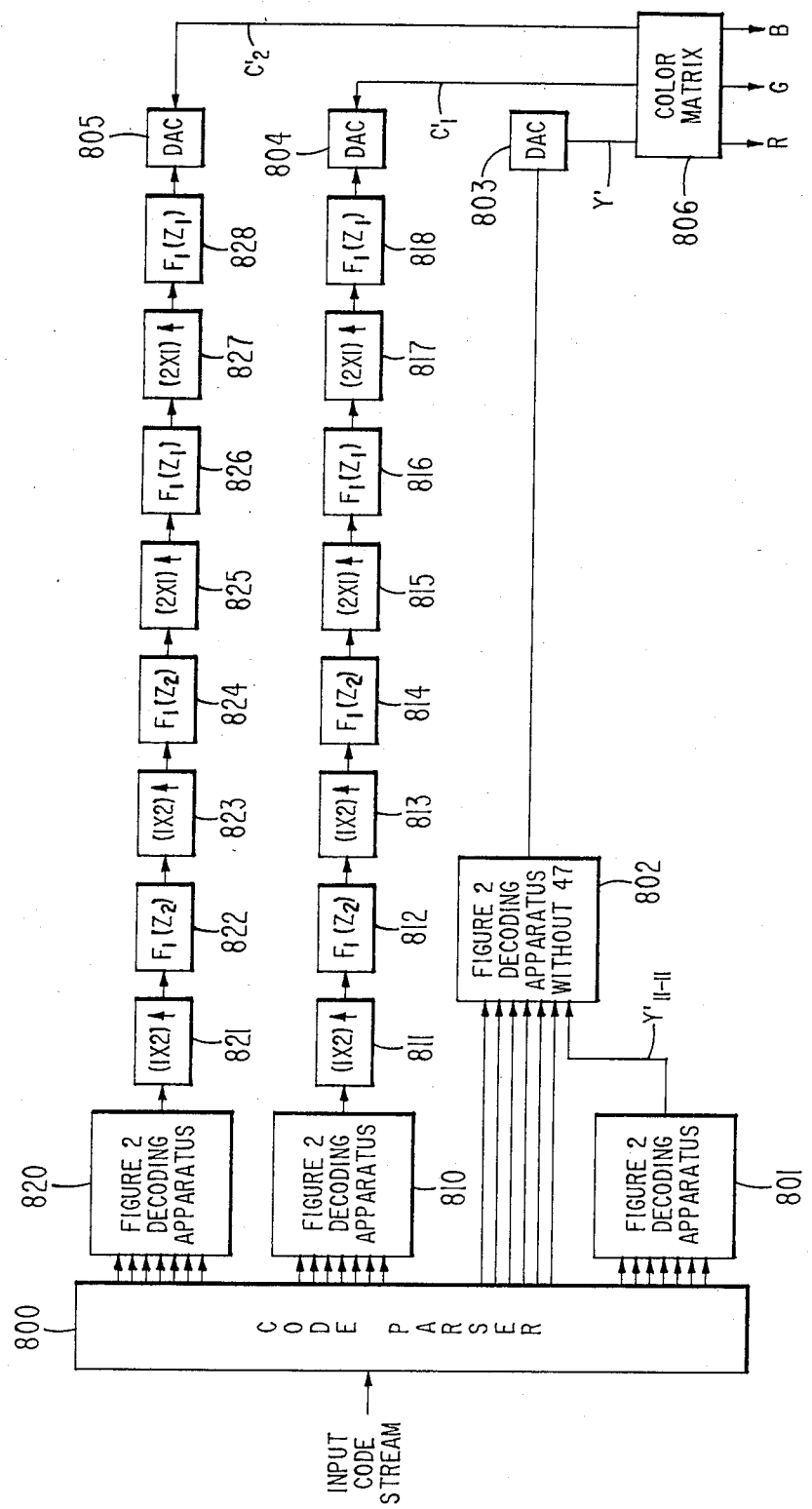
FIG. 4 is a schematic diagram of representative apparatus for decoding codes as generated by apparatus of the sort shown in FIG. 3 and synthesizing color signals descriptive of polychromatic images in accordance with a still further aspect of the invention.

Of substantial interest is how the present invention may be used in the subband coding of polychromatic images. FIGS. 3 and 4 show how the coding and decoding apparatuses thus far described may be incorporated in apparatuses for subband coding and decoding of polychromatic images.

The FIG. 3 encoding apparatus proceeds, for example, from the analog red (R), green (G) and blue (B) color signals furnished by a color television camera or other color signal source. A color matrix circuit 700 converts the color signals to a luminance signal, Y, and two chrominance signals, $C_1$ and $C_2$. The Y, $C_1$ and $C_2$ signals are digitized in analog-to-digital converters 701, 702 and 703 respectively. the luminance signal is defined in terms of R, G and B color signals by the following equation or its like.

$$Y=0.30R+0.59G+0.11B$$

The chrominance signals $C_1$ and $C_2$ may be simple color difference signals such as R-Y and B-Y, for example. To avoid having to deal with negative color values $C_1$ and $C_2$ may be primary color signals such as R and G. The chrominance signals $C_1$ and $C_2$ may also be the color-difference signals I and Q, respectively, as defined by the following equations or their like.

$$I=0.60R+0.28G-0.32B$$

$$Q=0.21R-0.52G+0.31B$$

The human visual system has less acuity for chrominance than for luminance, and has less color-difference signal acuity for Q than for I color difference signal. Color matrix circuit 700 puts the signals descriptive of polychromatic images into a format where substantial savings on spatial filtering can be obtained by subsampling chrominance signals $C_1$ and $C_2$ respective to the luminance signal Y, in both first and second orthogonal spatial dimensions.

FIG. 3 presumes 4:1 subsampling of the $C_1$ and $C_2$ signals respective to Y signal both in the horizontal direction and in the vertical direction, which can be appropriate for $C_1=R-Y$ and $C_2=B-Y$, for example. One may use 8:1 subsampling in each direction instead on one or both of the $C_1$ and $C_2$ signals. A 4:1 subsampling in each direction for $C_1=I$ and a 8:1 subsampling in each direction for $C_2=Q$ may, for example, be used.

The digitized Y signal which is to be fully sampled in the encoding procedure is subjected to four stages of analysis. The first two stages of analysis are carried out in codinfg apparatus 704, similar to that in FIG. 1 except for the omission of coder 37 to encode a $Y_{11-11}$ response. The $Y_{11-11}$ response is instead used as the input signal for further coding apparatus 705 similar to that in FIG. 1. The Y-descriptive codes from apparatuses 704 and 705 are supplied to a code combiner 706 for combining them together with each other, with $C_1$-descriptive codes and with $C_2$-descriptive codes.

The $C_1$-descriptive codes are generated by encoding apparatus 707, similar to that shown in FIG. 1, in response to analog-to-digital converter 702 output signal as subjected to two-dimensional low-pass spatial filtering. The $C_2$-descriptive codes are generated by encoding apparatus 708, similar to that shown in FIG. 1, in response to analog-to-digital converter 703 output signal as subjected to two-dimensional low-pass spatial filtering. Assume the low-pass spatial filtering is done on a pipelined basis using raster-scanned R, G, B and Y, $C_1$, $C_2$ signals. Then it is most efficient of digital hardware to perform all convolutions in the row direction in which scan lines extend before performing convolutions in the column direction perpendicular to scan lines. In line with this preference, analog-to-digital converter 702 output signal is convolved with the low-pass filter kernel in the row direction in a convolver 711 and the result decimated 2:1 in the row direction by a decimator 712. The decimator 712 response is convolved with the low-pass filter kernel in the row direction in a convolver 713 and the result is decimated 2:1 in fthe row direction by a decimator 714. With spatial filtering in the row direction completed, decimator 714 response is convolved with the low-pass filter kernel in the column direction in a convolver 715 and the result decimated in a decimator 716. The decimator 716 response is convolved with the low-pass filter kernel in the column direction in a convolver 717 and the result decimated in a decimator 718, to supply input signal to encoding apparatus 707. Analogously, digitized $C_2$ signal from analog-to-digital converter 703 is filtered by row-direction convolver 721, row-direction 2:1 decimator 722, row-direction convolver 723, row-direction 2:1 decimator 724, column-direction convolver 725, column-direction 2:1 decimator 726, column-direction convolver 727 and column-direction 2:1 decimator 728 to generate input signakl for encoding appartus 708. The use of the same low-pass filter kernel in the spatial filtering between A-to-D converter 702 and encoding apparatus 707, the spatial filtering between A-to-D converter 703 and encoding apparatus 708, and in the encoding apparatus 704 maintains the temporal alignment, or isochronality, of input signals to the encoding apparatuses 705, 707 and 708. This reduces the complexity of delay compensation in the system.

Using the same low-pass filter kernel also makes the savings in digital hardware resulting from subsampling I and Q prior to subband coding better evident. The spatial filter comprising elements 711–718 and the spatial filter comprising elements 721–728 each have one-third the number of convolvers and one-third the number of decimators that the two stages of quadrature mirror filtering each replaces would have.

FIG. 4 shows decoding apparatus for recovering polychromatic image descriptions, in component color signal form, from the codes generated by the FIG. 3 encoding apparatus. A code parser 300 receives an input code stream, supplied by the code combiner 706 of the FIG. 3 encoding apparatus as its output code stream, and regenerates the parallel code streams supplied by component encoding apparatuses 704, 705, 707 and 708 of the FIG. 3 encoding apparatus. For this to be done, delay compensation has to be supplied in one or both the code combiner 706 and code parser 300, which is a matter of straightforward design to one skilled in the art. When one encoding apparatus per FIG. 3 is used with a multiplicity of decoding apparatuses per FIG. 4, it is preferable that delay compensation reside primarily in code combiner 706.

The codes generated by component encoding apparatus 705 are decoded by a decoding apparatus 801 of the sort shown in FIG. 2, to generate a replica $Y'_{11-11}$ of the $Y_{11-11}$ signal supplied to encoding apparatus 705. Another component decoding apparatus 802, similar to that shown in FIG. 2 except for the omission of decoder 47 for recovering $Y'_{11-11}$ signal, receives its $Y'_{11-11}$ signal from component decoding apparatus 801. Component decoding apparatus 802 generates $Y'_{11-12}$, $Y'_{1-1-21}$, $Y'_{11-22}$, $Y_{11}'$, $Y_{12}'$, $Y_{21}'$ and $Y_{22}'$ signals internally by decoding the associated codes supplied to it from code parser 800, and combines them with the $Y'_{11-11}$ signal in a two-dimensional interpolation procedure. This procedure synthesizes digitized Y' whichis then converted to analog form by a digital-to-analog converter 803. Y' is a replica of the original Y signal from color matrix 700.

In response to digital input signal obtained in a way described in the next paragraph, two other digital-to-analog converters 804 and 805 generate $C_1'$ and $C_2'$ narrow-band replicas of the original full-band $C_1$ and $C_2$ signals from color matrix 700. The analog signals from converters 803, 804 and 805 are supplied to color matrixing circuitry 806, which linearly combines these analog signals to generate R, G and B mixed-high color signals.

Rather than having to use four stages of quadrature mirror filtering to recover $C_1'$ in digital form, two-stage decoding apparatus 810 similar to that shown in FIG. 2 followed by a simple two-dimensional expansion filter comprising elements 811–818 suffices. Analogously, rather than having to use four stages of quadrature mirror filtering to recover $C_2'$ in digital form, two-stage decoding apparatus 820 similar to that shown in FIG. 2 followed by a simple two-dimensional expansion filter comprising elements 821–828 suffices. These expansion filters use the same low-pass filter kernel as decoding apparatuses 801, 802, 810 and 820.

What is claimed is:

1. A method for coding images consisting of sampled data concerning the intensities of a first closely packed two-dimensional array of similar-size picture elements, said method comprising a plurality p in number of successive analytic procedures each consisting of a respective combination of steps, which analytic procedures are consecutively ordinally numbered first through $p^{th}$ in order of their performance, each of which analytic procedures includes in its respective combination of steps the steps of:

convolving a closely packed array of similar-size picture elements, which array is ordinally numbered the same as the analytic procedure this step is included in, with two-dimensional quadrature mirror filter kernels in order to decompose this array into a low-pass filter response component and three high-pass filter response components for the analytic procedure;

as a substep of said step of convolving, two-dimensionally decimating the three high-pass filter response components; and encoding the three high-pass filter response components without any spatial-frequency analyzing substeps each of which analytic procedures except the $p^{th}$ includes in its step of convolving the substep of:

two dimensionally decimating the low-pass filter response component obtained during that analytic procedure, thereby to generate a closely packed array of similar-sized picture elements, which array is ordinally numbered the same as the succeeding analytic procedure and has picture elements larger than those in the array numbered the same as the analytic procedure this step is included in and which $p^{th}$ analytic procedure includes in its combination the step of:

encoding the low-pass filter response component obtained during the $p^{th}$ analytic procedure.

2. A method as set forth in claim 1 wherein the step of encoding the low-pass filter response component obtained during the $p^{th}$ analytic procedure includes the initial substep of two-dimensionally decimating that response.

3. A method as set forth in claim 2 wherein each said step of two-dimensionally decimating and said substep of two-dimensionally decimating all in effect subsample 2:1 in one dimension of image space and subsequently subsample 2:1 in the other, orthogonal dimension of two-dimensional image space.

4. A method as set forth in claim 1 wherein each said step of two-dimensionally decimating in effect subsamples 2:1 in one dimension of image space and subsequently subsamples 2:1 in the other, orthogonal dimension of two-dimensional image space.

5. A method for synthesizing a signal descriptive of images, from codes of the type generated by the method of claim 1, comprising a plurality p in number of consecutively ordinally numbered synthesis procedures performed in reverse order of their numbering, each of which synthesis procedures consists of a respective combination of steps, each of which analytic procedures includes in its respective combination of steps the steps of:

decoding respective ones of the codes to recover the three decimated high-pass filter response components for that synthesis procedure;

obtaining the decimated low-pass filter response component for that synthesis procedure;

interspersing the filter responses for that synthesis procedure among null samples and convolving the resulting expanded sample matrices with two-dimensional quadrature mirror filter kernels, thereby to perform two-dimensional interpolations, and then summing the results of these two-dimensional interpolations to generate a sum result, said sum result for each synthesis procedure with ordinal numbering higher than one being the decimated low-pass filter response for the synthesis procedure with next lowest ordinal number and being the synthesized signal descriptive of images for the first synthesis procedure and said $p^{th}$ synthesis procedure obtainings its decimated low-pass filter response by decoding the code encoding of the low-pass filter response component obtained during the $p^{th}$ analysis procedure.

6. A method for coding polychromatic images consisting of sampled data converning the intensities in each of three color variables of a first closely packed two dimensional array of similar size picture elements, said method comprising the procedures of:

combining data concerning the three color variables for each picture element in a color matrixing procedure to generate a description of each picture element in terms of a luminance variable and orthogonal first and second chrominance variables;

analyzing said luminance variable in a plurality p in number of successive luminance variable analyzing subprocedures, consecutively ordinally numbered first through $p^{th}$ in order of their performance, thereby to generate three high pass filter response components and a low pass filter response component for each luminance variable analyzing subprocedure;

two dimensionally low pass spatially filtering said first chrominance variable in a plurality q in number of successive first chrominance variable filtering subprocedures, which first chrominance variable filtering subprocedures are consecutively ordinally numbered first through $q^{th}$ in order of their performance, q being a plural integer smaller than p by at least two;

analyzing said low pass spatially filtered first chrominance variable in a plurality (p−q) of successive first chrominance variable analyzing subprocedures consecutively ordinally numbered $(q+1)^{th}$ through $p^{th}$ in order of their performance, thereby to generate three high pass filter response components and a low pass filter response component for each said first chrominance variable analyzing subprocedure;

two-dimensionally low pass spatially filtering said second chrominanace variable in a plurality r in number of successive second chrominance variable filtering subprocedures, which second chrominance variable subprocedures are consecutively ordinally numbered first through $r^{th}$, r being a plural integer smaller than p by at least two;

analyzing said low pass spatially filtered second chrominance variable in a plurality (p−r) of successive second chrominance variable analyzing subprocedures consecutively ordinally numbered $(r+1)^{th}$ through $p^{th}$ in order of their performance, thereby to generate three high pass filter response components and a low pass filter response component for each said second chrominance variable analyzing subprocedure;

encoding the three high pass filter response components for each of said luminance variable, first chrominance variable and second chrominance variable analyzing subprocedures; and encoding the respective low pass filter response components of said $p^{th}$ luminance variable analyzing subprocedure, said $p^{th}$ first chrominance variable analyzing subprocedure and said $r^{th}$ second chrominance variable analyzing subprocedure wherein each of said filtering subprocedures includes therein the respective steps of:

convolving a closely packed array of similar size picture elements, which array is ordinally numbered the same as the filtering subprocedure this step is included in with a two dimensional low pass filter kernel to obtain a low pass filter response; and two dimensionally decimating the low pass filter response obtained during that subprocedure, thereby to generate a closely packed array of similar sized picture elements, which array is ordinally numbered consecutively after the ordinal number of that filtering subprocedure and has picture elements larger than those in the array ordinally numbered the same as that filtering subprocedure wherein each of said analyzing subprocedures includes therein the respective steps of:

convolving a closely packed array of similar size picture elements, which array is ordinally numbered the same as the analytic subprocedure this step is included in, with two dimensional quadrature mirror filter kernels in order to decompose this array into a low pass filter response component and three high pass filter response components for the analytic subprocedure;

two-dimensionally decimating the three high pass filter response components obtained during that analytic subprocedure before said encoding of them; and wherein each of which analytic subprocedures except the $p^{th}$ includes the respective step of:

two-dimensionally decimating the low pass filter response component obtained during that analytic subprocedure, thereby to generate the one of said closely packed array of similar sized picture elements that is ordinally numbered the same as the succeeding analytic subprocedure and has picture elements larger than those in the array numbered the same as the analytic subprocedure this step is included in —and wherein each of said $p^{th}$ analytic subprocedures includes the respective step of two dimensionally decimating the low pass filter response component obtained during that $p^{th}$ analytic subprocedure before said encoding of it.

7. A method for coding polychromatic images as set forth in claim 6 wherein q and r are equal to each other.

8. A method for synthesizing signals descriptive of images, from codes of the type generated by the method of claim 6, comprising the procedures of:

synthesizing a luminance signal from the codes descriptive of said luminance variable in a plurality p in number of successive luminance-signal synthesizing subprocedures consecutively ordinally numbered first through $p^{th}$ in reverse order of their performance;

synthesizing a first chrominance signal from the codes descriptive of said first chrominance variable in a plurality p in number of successive first-chrominance-signal synthesizing subprocedurres consecutively ordinally numbered first through $q^{th}$ through $p^{th}$ in reverse order of their performance of being an integer between one and (p−1); and synthesizing a second chrominance signal from the codes descriptive of said second chrominance variable in a plurality p in number of successive second-chrominance-signal synthesizing subprocedures consecutively ordinally numbered first through $r^{th}$ through $p^{th}$ in reverse order of their performance, r being an integer between one and (p−1)

wherein each of said first through $p^{th}$ luminance-signal synthesizing subprocedures, each of the $(q+1)^{th}$ through $p^{th}$ first-chrominance-signal synthesizing subprocedures, and each of the $(r+1)^{th}$ through $p^{th}$ second-chrominance-signal synthesizing subprocedures includes in its respective combination of steps the steps of:

decoding respective ones of the codes to recover the three decimated high-pass filter response components for that synthesizing subprocedure;

obtaining the decimated low-pass filter response component for that synthesizing subprocedure;

interspersing the filter responses components for that synthesizing subprocedure among null samples and convolving the resulting expanded sample matrices with two-dimensional quadrature mirror filter kernels, thereby to perform two-dimensional interpolations, and then summing the results of these two-dimensional interpolations to generate that synthesizing subprocedure result wherein each of the first through $q^{th}$ first-chrominance-signal synthesizing subprocedures and each of the first through $r^{th}$ second-chrominance-signal synthesizing subprocedures includes in its respective combination of steps the steps of:

obtaining the decimated low-pass filter response component for that synthesizing subprocedure;

interspersing that low-pass filter response component among null samples; and convolving the resulting expanded sample matrix with a low-pass filter kernel, thereby to perform a two-dimensional interpolation that generates that synthesizing subprocedure result wherein the $p^{th}$ synthesizing subprocedure in each of said synthesizing procedures the respective decimated low-pass filter response is obtained by decoding the code encoding the low-pass filter response component obtained during the corresponding $p^{th}$ analyzing subprocedure wherein, within each of said synthesizing subprocedures except the first in a synthesis procedure, the synthesizing subprocedure result is used as the decimated low-pass filter response component for the synthesizing subprocedure with next lower ordinal numbering and wherein the first synthesizing subprocedure results of said procedures of synthesizing a luminance signal, of synthesizing a first chrominance signal, and of synthesizing a second chrominance signal are these signals respectively.

9. A method for synthesizing signals descriptive of images as set forth in claim 8 wherein q and r are equal to each other.

* * * * *